US005889453A

United States Patent [19]

Siepmann et al.

[11] Patent Number: 5,889,453

[45] Date of Patent: Mar. 30, 1999

[54] RELAY WITH OVERLOAD PROTECTION

[75] Inventors: Richard Siepmann, Munich; Gregor Ploeger, Berlin, both of Germany

[73] Assignee: Siemens Aktiengesellschaft, Munich, Germany

[21] Appl. No.: 925,664

[22] Filed: Sep. 9, 1997

[30] Foreign Application Priority Data

Sep. 11, 1996 [DE] Germany ........................ 196 36 932.0

[51] Int. Cl.$^{6}$ ........................ H01H 51/22

[52] U.S. Cl. ........................ 335/83; 335/128

[58] Field of Search ........................ 335/78–86, 124, 335/128; 338/23

[56] References Cited

U.S. PATENT DOCUMENTS

| | | | |
|---|---|---|---|
| 3,240,996 | 3/1966 | Sohns . | |
| 4,237,441 | 12/1980 | van Konyenburg et al. . | |
| 4,504,817 | 3/1985 | Shikama et al. | 338/23 |
| 5,170,322 | 12/1992 | Von Guttenberg | 361/386 |
| 5,291,166 | 3/1994 | Chikira | 335/78 |

FOREIGN PATENT DOCUMENTS

| | | |
|---|---|---|
| 0 487 920 A1 | 6/1992 | European Pat. Off. . |
| 3145546A1 | 10/1982 | Germany . |
| 3209915A1 | 9/1983 | Germany . |
| 3708723A1 | 9/1988 | Germany . |
| 3428595C2 | 5/1991 | Germany . |

*Primary Examiner*—Lincoln Donovan
*Attorney, Agent, or Firm*—Hill & Simpson

[57] ABSTRACT

A relay for overcurrent or short-circuit protection is provided wherein the relay has a thermistor in the form of a film of polymer material. The thermistor is arranged over a large surface in the interior of the relay between a connection segment of a terminal element and a terminal plate coupled parallel thereto. By such design, the thermistor is serially connected into the load circuit of the relay. Upon the appearance of either an overcurrent or a short circuit, the thermistor makes an immediate shift to a high resistance value, thereby interrupting the load circuit.

10 Claims, 2 Drawing Sheets

17
11
1
6
15
3
7
16
13
19
14
4
18
12
LOAD

RELAY WITH OVERLOAD PROTECTION

BACKGROUND OF THE INVENTION

1. Field of the Invention

The present invention is directed to a relay having at least one pair of contacts as well as terminal elements for a load circuit wherein at least one of the terminal elements is coupled parallel with a terminal plate having a flat connection segment in order to produce an electrical connection having a contact element in the interior of the relay.

2. Description of the Prior Art

A relay of the general type described above is known, for example, from German Patent No. DE 37 08 723 A1. Such relays are typically used in automotive engineering, but they are also employed in a variety of other applications. In automobiles, it is standard practice to have the current circuits fused in a fuse box and then conducted to their respective loads via relays or switches. However, new designs, particularly those of bus systems, require a self-fused switch. This means that a peripherally-arranged relay must be fused against overload at its immediate location of use. Thus, it is also generally known to attach a fuse element directly to a relay as described, for example, in German Patent No. DE 32 09 915 A1. However, this known construction requires a special design of the relay itself. Moreover, in terms of space, this construction is fairly costly.

SUMMARY OF THE INVENTION

The object of the present invention is to provide a relay of the above-noted type having overload protection which only requires a relatively minor change in design from the generally standard relay construction and which virtually obviates the need for additional space requirements.

This object is achieved in a relay having a layer-shaped thermistor arranged between a connection segment of a terminal element and a terminal plate. The thermistor, in the form of a film of polymer plastic, is preferably incorporated into a relay wherein the connection segment and the terminal plate serve as electrodes of the thermistor. Polymer thermistors of this type are known, for example, from U.S. Pat. No. 4,237,441.

The specific construction of the connection segment and the terminal plate as electrodes of the thermistor depends on the design of the rest of the relay. For example, if large-surface connection elements are present anyway, these may be used with some minor modifications. In other relays, an additional terminal plate can be housed within the relay without experiencing large changes in the relay's construction wherein the terminal plate can be connected with a contact spring or other contact element via a flexible lead.

Additional features and advantages of the present invention are described in, and will be apparent from, the detailed description of the presently preferred embodiments and from the drawings.

DETAILED DESCRIPTION OF THE PREFERRED EMBODIMENTS

Figure 1:
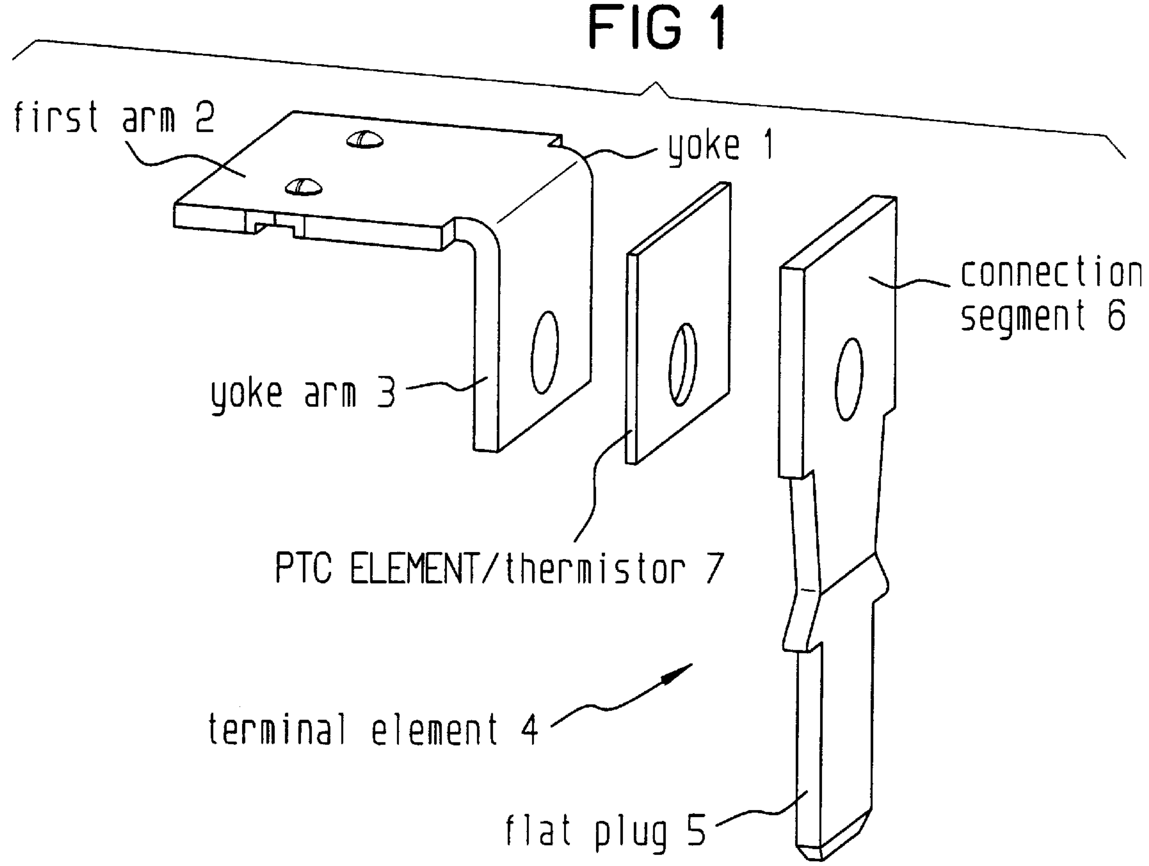
FIG. 1 shows an embodiment of the present invention including a thermistor film arranged between a yoke arm and a flat plug of a relay.

FIG. 1 shows a part of a relay that could, for example, have a basic design which is similar to that described in the aforementioned patent DE 37 08 723 A1. Here, only an L-shaped yoke 1 of a relay is shown on whose first arm 2 an armature (not shown) can be mounted using an armature spring. A second arm, yoke arm 3, is connected to a core (not shown) that is arranged inside a coil. The yoke 1 serves to supply current to a contact spring connected to the armature. For this purpose, a flat terminal element 4 is connected with the yoke arm 3. The terminal element 4 is of relatively standard design and includes a flat plug 5 at one end and a flat connection segment 6 at the other. Pursuant to a conventional construction, the connection segment 6 is welded over a large surface to the yoke arm 3, or is soldered to it.

In the embodiment shown in FIG. 1, a thermistor 7 is positioned between the yoke arm 3 and the connection segment 6 as an intermediate layer in the form of a film. In this way, the thermistor 7 is connected in series into the load current circuit of the terminal element 4. Thermistors of this type, particularly those made of polymer material, have low resistances up to their transition temperature. Above the transition temperature, such thermistors increase their resistances by powers of ten within a few degrees. Thus, as long as a nominal current flows through the thermistor 7 in the load circuit, the thermistor 7 remains in the low resistance region. Conversely, in case of overload, the power loss, which increases as the square of the current, heats the thermistor 7 to the transition temperature. As voltage continues to be applied, only as much current as is required to maintain the transition temperature continues to flow. Accordingly, the contact elements of the relay, the conductors, the current supply and the load are protected both against overload and in case of a short circuit.

Figure 2:
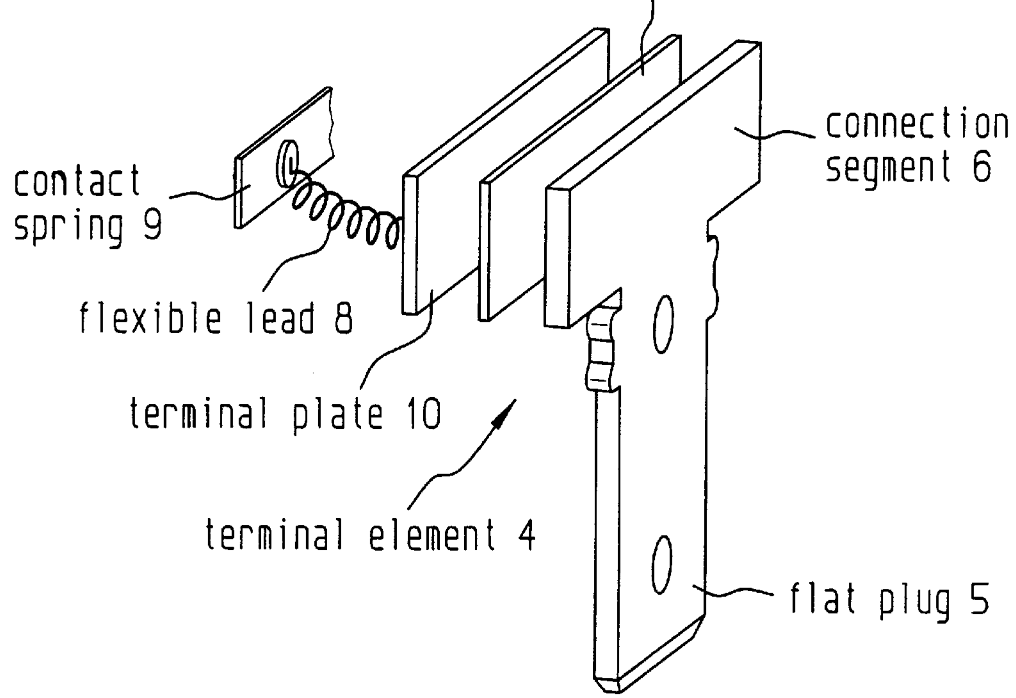
FIG. 2 shows an embodiment of the present invention including a thermistor film arranged between a flat plug and an additional terminal plate in a relay.

FIG. 2 shows an alternative embodiment of the present invention wherein the inventive overload protection is incorporated into a relay in which the load current is not conducted via the yoke, but rather is conducted to a contact spring by the terminal element via a flexible lead. More specifically, and as shown in FIG. 2, a load terminal element 4 has a flat plug 5 and a flat connection segment 6. In the interior of the relay, the load current is conducted immediately to a contact spring 9 via a flexible lead 8. The contact spring 9 is connected to, or at least actuated by, an armature (not shown). While in a conventional relay design the flexible lead 8 would be connected immediately to the connection segment 6, the inventive design includes an additional terminal plate 10 having a large surface which stands opposite the connection segment 6. The welded or soldered flexible lead 8 connects the terminal plate 10 to the contact spring 9. In a preferred embodiment, a thermistor 7 is inserted between the terminal plate 10 and the connection segment 6 wherein the thermistor 7 functions in a manner consistent with that which was described in connection with the embodiment shown in FIG. 1.

Figure 3:
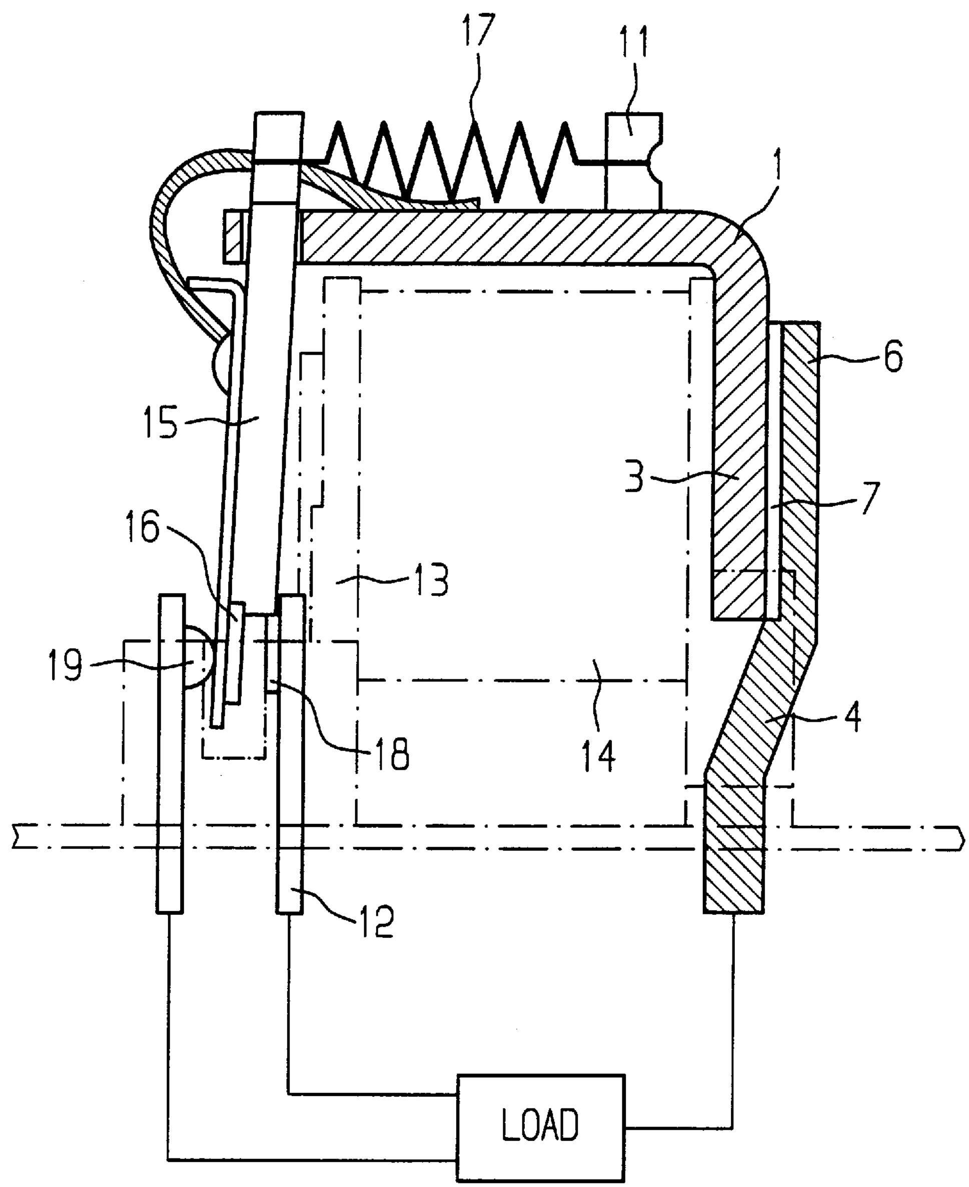
FIG. 3 shows the embodiment of the present invention from FIG. 1 incorporated into a complete relay package.

FIG. 3 shows the embodiment of the present invention from FIG. 1 in a complete relay package as is known in the prior art. Such relay is of the general type described in German Patent No. DE 37 08 723 A1. This relay includes a yoke 1 to which a coil body 13 and coil 14 are connected. An armature 15 is coupled to the yoke 1 wherein the armature is positioned as shown in FIG. 3 with respect to the yoke 1 via a spring 17 when the coil 14 is not carrying a current. The armature 15 includes a switching contact 16 which engages a limit stop 19 at the depicted resting position. The limit stop 19 is arranged and secured jointly with a stationary contact 18 in the coil body 13 - the stationary contact 18 being conductively secured by a soldering paste 12. The spring 17 is coupled to the armature 15 at a first end and secured by a hook 11 at a second end wherein the hook is formed from the material of the yoke 1.

The embodiment of the present invention shown in FIG. 1 may be incorporated into the known relay design described above. As shown in FIG. 3, the thermistor 7 is positioned between the yoke arm 3 of the yoke 1 and the connection segment 6 of the terminal element 4. Accordingly, the thermistor 7 is connected in series into the load current circuit of the terminal element 4.

As may be seen from the exemplary embodiments, the thermistor 7 can be processed into a form that is specific to the application, particularly when the thermistor 7 is in the form of a polymer film. It is only important that the thermistor 7 be arranged between two electrode plates in the load circuit. In the exemplary embodiments shown, the electrode plates are formed by a connection segment 6 on one side and either a terminal plate 3 or 10 on the other side.

Although the present invention has been described with reference to specific embodiments, those of skill in the art will recognize that changes may be made thereto without departing from the spirt and scope of the invention as set forth in the hereafter appended claims.

We claim as our invention:

1. A relay, comprising:

a housing;

a winding in said housing for connection in an excitation circuit;

a core in said winding;

an armature in said housing movably mounted for actuation by electromagnetic forces of said winding upon application of an excitation signal from said excitation circuit;

at least one fixed contact element in said housing;

a movable contact element in said housing affixed to said armature for movement alternately into contact with said fixed contact element and out of contact with said contact element;

terminal elements extending from said housing and connected to said fixed and movable contact elements to connect said fixed and movable contact elements in a load circuit, at least one of said terminal elements having a flat connection segment;

a terminal plate having a portion parallel with said flat connection segment, said terminal plate being electrically connected to one of said fixed and movable contact elements; and a layer-shaped thermistor positioned between said flat connection segment and said terminal plate, said layer-shaped thermistor being electrically connected between said flat connection segment and said terminal plate to electrically connect said layer-shaped thermistor in said load circuit.

2. A relay as claimed in claim 1, further comprising:

a polymer plastic film as the thermistor wherein the connection segment of the terminal element and the terminal plate serve as electrodes of the thermistor.

3. A relay as claimed in claim 1, further comprising:

a flat plug as a part of the terminal element, the flat plug being an extension of the connection segment.

4. A relay as claimed in claim 2, further comprising:

a flat plug as a part of the terminal element, the flat plug being an extension of the connection segment.

5. A relay as claimed in claim 1, wherein:

the terminal plate is integrally-formed as a segment of a yoke of the relay.

6. A relay as claimed in claim 2, further comprising:

the terminal plate is integrally-formed as a segment of a yoke of the relay.

7. A relay as claimed in claim 3, further comprising:

the terminal plate is integrally-formed as a segment of a yoke of the relay.

8. A relay as claimed in claim 1, further comprising:

a flexible conductor element electrically connected between the terminal plate and the contact element.

9. A relay as claimed in claim 2, further comprising:

a flexible conductor element electrically connected between the terminal plate and the contact element.

10. A relay as claimed in claim 3, further comprising:

a flexible conductor element electrically connected between the terminal plate and the contact element.

* * * * *